US012570845B2

(12) United States Patent
Shingai et al.

(10) Patent No.: US 12,570,845 B2
(45) Date of Patent: Mar. 10, 2026

(54) OBJECT FORMING LIQUID AND OBJECT PRODUCING METHOD

(71) Applicants: Yuki Shingai, Kanagawa (JP); Shinichiroh Satoh, Tokyo (JP)

(72) Inventors: Yuki Shingai, Kanagawa (JP); Shinichiroh Satoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1043 days.

(21) Appl. No.: 17/653,295

(22) Filed: Mar. 3, 2022

(65) Prior Publication Data

US 2022/0282080 A1 Sep. 8, 2022

(30) Foreign Application Priority Data

Mar. 5, 2021 (JP) ................................ 2021-035481

(51) Int. Cl.

| | |
|---|---|
| ***C08L 31/04*** | (2006.01) |
| ***B22F 1/102*** | (2022.01) |
| ***B22F 10/14*** | (2021.01) |
| ***C08L 37/00*** | (2006.01) |
| ***C08L 39/04*** | (2006.01) |

(52) U.S. Cl.

CPC .............. *C08L 31/04* (2013.01); *B22F 1/102* (2022.01); *B22F 10/14* (2021.01); *C08L 37/00* (2013.01); *C08L 39/04* (2013.01); *B22F 2301/052* (2013.01); *B22F 2301/058* (2013.01); *B22F 2301/30* (2013.01)

(58) Field of Classification Search

CPC .......... C08L 31/04; C08L 37/00; C08L 39/04; B22F 1/102; B22F 10/14; B22F 2301/052; B22F 2301/058; B22F 2301/30; B22F 3/10; B22F 3/1021; Y02P 10/25; B33Y 10/00; B33Y 40/20; B33Y 70/00; B33Y 70/10; C09J 129/14; C09J 139/06; C08F 8/00; C08F 8/28; C08F 126/10

See application file for complete search history.

(56) References Cited

U.S. PATENT DOCUMENTS

| | | | |
|---|---|---|---|
| 10,780,631 B2 | 9/2020 | Patel | |
| 11,045,976 B2 | 6/2021 | Sasaki et al. | |

(Continued)

FOREIGN PATENT DOCUMENTS

| | | | |
|---|---|---|---|
| EP | 3501692 B1 * | 9/2020 | .............. B22F 10/10 |
| EP | 3760344 | 1/2021 | |

(Continued)

OTHER PUBLICATIONS

Extended European Search Report dated Jul. 18, 2022, in European Application No. 22160063.8, 8 pages.

(Continued)

*Primary Examiner* — Doris L Lee

(74) *Attorney, Agent, or Firm* — Grüneberg Global IP, PLLC

(57) ABSTRACT

Provided is an object forming liquid containing a resin containing at least one structural unit selected from the group consisting of a structural unit represented by a predetermined structural formula (1) and a structural unit represented by a predetermined structural formula (2), and an organic solvent, and substantially free of water. The object forming liquid is applied to a layer of a powder containing metal particles.

18 Claims, 3 Drawing Sheets

(56) References Cited

U.S. PATENT DOCUMENTS

| | | | | |
|---|---|---|---|---|
| 2016/0040025 | A1 | 2/2016 | Norikane et al. | |
| 2016/0160021 | A1 | 6/2016 | Kojima et al. | |
| 2016/0177122 | A1 | 6/2016 | Naruse et al. | |
| 2016/0200908 | A1* | 7/2016 | Osaka | C08L 39/06 524/556 |
| 2016/0236412 | A1 | 8/2016 | Kusahara et al. | |
| 2016/0271695 | A1 | 9/2016 | Osaka et al. | |
| 2016/0271877 | A1 | 9/2016 | Suzuki et al. | |
| 2016/0271879 | A1 | 9/2016 | Yamashita et al. | |
| 2016/0272817 | A1 | 9/2016 | Naruse et al. | |
| 2016/0272844 | A1 | 9/2016 | Osaka et al. | |
| 2016/0288206 | A1 | 10/2016 | Ohtaki et al. | |
| 2018/0001520 | A1 | 1/2018 | Saito et al. | |
| 2018/0297277 | A1 | 10/2018 | Yoshikawa et al. | |
| 2019/0054527 | A1* | 2/2019 | Natarajan | B22F 1/107 |
| 2020/0001359 | A1 | 1/2020 | Nilsson et al. | |
| 2020/0290124 | A1 | 9/2020 | Oya | |
| 2021/0001543 | A1 | 1/2021 | Sogame et al. | |
| 2021/0039311 | A1 | 2/2021 | Kusahara et al. | |
| 2021/0053116 | A1 | 2/2021 | Seleznev et al. | |
| 2021/0292511 | A1 | 9/2021 | Satoh | |
| 2021/0394263 | A1 | 12/2021 | Yamada et al. | |

FOREIGN PATENT DOCUMENTS

| | | |
|---|---|---|
| JP | 2016-028872 | 3/2016 |
| JP | 2018-002908 | 1/2018 |
| JP | 2018-154074 | 10/2018 |
| JP | 2019-503884 | 2/2019 |
| JP | 2020-511593 | 4/2020 |
| JP | 2020-79431 | 5/2020 |
| JP | 2020-152001 | 9/2020 |
| JP | 2020-531313 | 11/2020 |
| WO | WO2021/002479 A1 | 1/2021 |
| WO | WO2021/193339 A1 | 9/2021 |

OTHER PUBLICATIONS

Japanese Office Action dated Oct. 18, 2022, in Japanese Application No. 2021-035481, with English translation, 4 pages.

* cited by examiner

OBJECT FORMING LIQUID AND OBJECT PRODUCING METHOD

CROSS-REFERENCE TO RELATED APPLICATIONS

The present application claims priority under 35 U.S.C. § 119 to Japanese Patent Application No. 2021-035481 filed Mar. 5, 2021. The contents of which are incorporated herein by reference in their entirety.

BACKGROUND OF THE INVENTION

Field of the Invention

The present disclosure relates to an object forming liquid and an object producing method.

Description of the Related Art

In recent years, there have been increasing needs for producing complicated, minute objects formed of, for example, metals. As a technique for meeting these needs in terms of a high productivity in particular, there is a method of forming a sintering precursor by a binder jetting method, and sintering and densifying the sintering precursor by a powder metallurgy method.

For example, a method disclosed as an example of the method for producing an object such as a sintering precursor by the binder jetting method applies a liquid containing a resin serving as a binder to particles containing a sinterable core and a resin coating at least a part of the core and removable by decomposition by, for example, heating (see Japanese Translation of PCT International Application Publication No. JP-T-2020-511593).

SUMMARY OF THE INVENTION

According to one aspect of the present disclosure, an object forming liquid contains a resin containing at least one structural unit selected from the group consisting of a structural unit represented by Structural formula (1) below and a structural unit represented by Structural formula (2) below, and an organic solvent, and is substantially free of water. The object forming liquid is applied to a layer of a powder containing metal particles.

Structural formula (1)

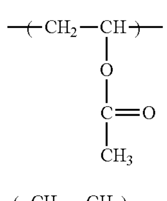

Structural formula (2)

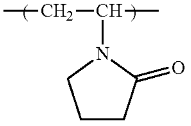

DESCRIPTION OF THE EMBODIMENTS

Figure 1A:
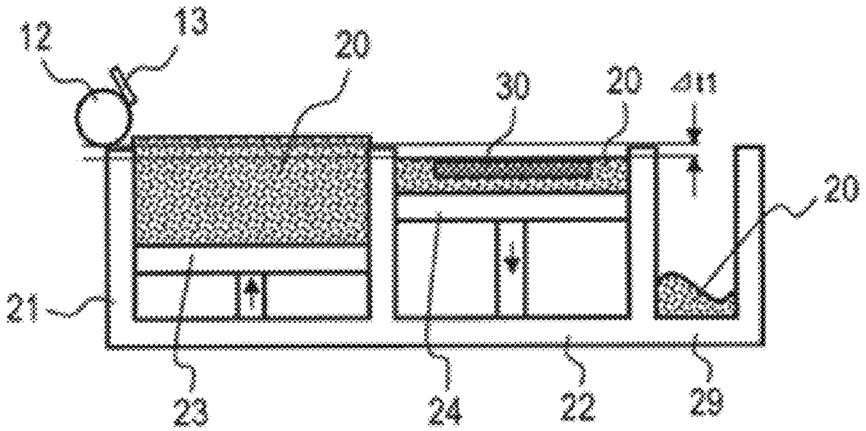
FIG. 1A is a schematic view illustrating an example of an operation of a three-dimensional object producing apparatus.

According to the existing technique, when producing an object by applying an object forming liquid containing a resin to a layer of a powder containing metal particles, there are problems that the viscosity of the object forming liquid is high, the bending strength of a green body is insufficient, and the sintering density of a sintered body is insufficient.

The present disclosure can provide an object forming liquid that has a low viscosity, improves the bending strength of a green body, and improves the sintering density of a sintered body.

An embodiment of the present disclosure will be described below.

<<Object Forming Liquid>>

An "object forming liquid" of the present disclosure is a liquid composition that is used for production of an object, and is applied to a layer of a powder containing metal particles.

Production of an object is carried out by a producing method including a layer laminating step including a powder layer forming step of forming a layer of a powder containing metal particles and an object forming liquid applying step of applying an object forming liquid to the layer of the powder, and including sequentially repeating the powder layer forming step and the object forming liquid applying step to form a laminate.

It is preferable to carry out production of an object by a producing method including in addition to the layer laminating step described above, for example, a heating step of heating the laminate to form a solidified product, an excessive powder removing step of removing an excessive powder, which is the powder adhering to the solidified product, to obtain a green body, a drying step of drying the green body to remove a liquid component remaining in the green body, a degreasing step of heating the green body to remove, for example, a resin derived from the object forming liquid applied, to obtain a degreased body, a sintering step of heating the degreased body to obtain a sintered body, and a post-treatment step of applying a post-treatment to the sintered body.

In the present disclosure, an "object" is a generic term of stereoscopic objects retained in fixed stereoscopic shapes, and represents a solidified product or a structure derived from a solidified product. Specifically, an "object" is a concept representing, for example, a solidified product, a green body, a degreased body, ad a sintered body.

In the present disclosure, an object forming portion having undergone the heating step may be referred to as "green body (unsintered body")", an object forming portion having undergone the degreasing step may be referred to as "degreased body", and an object forming portion having undergone the sintering step may be referred to as "sintered body".

The object forming liquid contains a resin, an organic solvent, and additives such as a surfactant. Various components contained in the object forming liquid will be described in detail below.

<Resin>

The object forming liquid contains a resin containing at least one structural unit selected from the group consisting of a structural unit represented by Structural formula (1) below and a structural unit represented by Structural formula (2) below. In the present disclosure, a "structural unit" represents a partial structure in a resin derived from one or more polymerizable compounds.

Structural formula (1)

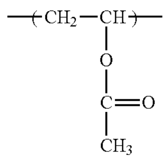

Structural formula (2)

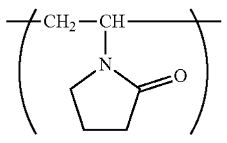

—Resin Containing a Structural Unit Represented by Structural Formula (1)—

A resin containing a structural unit represented by Structural formula (1) is deployed in a layer of a powder when the object forming liquid is applied to the layer of the powder containing metal particles, and functions as a binder that binds the metal particles with each other in a region to which the object forming liquid is applied through an appropriate heating step suited to the softening point of the resin, to form a pre-sintering object such as a solidified product or a green body derived from a solidified product. These pre-sintering objects have an improved bending strength because they are formed of the resin containing the structural unit represented by Structural formula (1) and having a flexibility imparting property.

The resin containing the structural unit represented by Structural formula (1) can be appropriately removed in the degreasing step because of its excellent thermal decomposability, and a sintered body produced through the subsequent sintering step has an improved density.

Hence, when metal particles, which are a material assumed being sintered or preferred being sintered, are used as the material for forming an object as in the present disclosure, the effect to be obtained is remarkable.

Specifically, it is preferable that the resin containing the structural unit represented by Structural formula (1) be thermally decomposed by 95% by mass or greater, more preferably 97% by mass or greater when subjected to temperature elevation from 30 degrees C. to 550 degrees C.

In the present disclosure, when "a resin thermally decomposes", for example, the main chain of the resin randomly degrades or a molecular chain end of the resin depolymerizes, so the resin is removed through, for example, vaporization, oxidative decomposition, or combustion. Thermal decomposability is measured with a thermogravimetry-differential thermal analysis system (TG-DTA). Specifically, the ratio of weight reduction between before and after temperature elevation is obtained when the resin is subjected to temperature elevation from 30 degrees C. to 550 degrees C. at a rate of 10 degrees C./minute in the atmosphere or a nitrogen atmosphere, and then subjected to temperature retention for 2 hours after the temperature reaches 550 degrees C.

The resin containing the structural unit represented by Structural formula (1) has an improved solubility in an organic solvent because the structural unit represented by Structural formula (1) has hydrophobicity. Therefore, when the object forming liquid contains an organic solvent, the resin containing the structural unit represented by Structural formula (1) has an improved solubility and can suppress the viscosity of the object forming liquid. This makes it possible to appropriately discharge the object forming liquid by, for example, an inkjet method.

It is preferable that the resin containing the structural unit represented by Structural formula (1) be soluble in the organic solvent of the object forming liquid and be insoluble in water.

The Tg of the resin containing the structural unit represented by Structural formula (1) is preferably 0 degrees C. or higher, more preferably 10 degrees C. or higher, and yet more preferably 20 degrees C. or higher. The Tg of the resin containing the structural unit represented by Structural formula (1) is preferably 100 degrees C. or lower, more preferably 90 degrees C. or lower, and yet more preferably 80 degrees C. or lower.

The softening point of the resin containing the structural unit represented by Structural formula (1) is preferably 70 degrees C. or higher, more preferably 80 degrees C. or higher, and yet more preferably 90 degrees C. or higher. The softening point of the resin containing the structural unit represented by Structural formula (1) is preferably 150 degrees C. or lower, more preferably 140 degrees C. or lower, and yet more preferably 30 degrees C. or lower.

The number average molecular weight (Mn) of the resin containing the structural unit represented by Structural formula (1) is preferably 5,000 or greater but 50,000 or less, and more preferably 10,000 or greater but 30,000 or less. When the number average molecular weight (Mn) of the resin containing the structural unit represented by Structural formula (1) is in the range described above, it is possible to satisfy both of improvement of strength and object production accuracy, and suppression of the viscosity of the object forming liquid and increase of the resin concentration in the object forming liquid.

The resin containing the structural unit represented by Structural formula (1) may be any selected from resins containing a structural unit represented by any other formula than Structural formula (1) and resins free of a structural unit represented by any other formula than Structural formula (1). As the structural unit represented by any other formula than Structural formula (1), for example, a structural unit represented by Structural formula (3) below and a structural unit represented by Structural formula (4) below are preferable.

Structural formula (3)

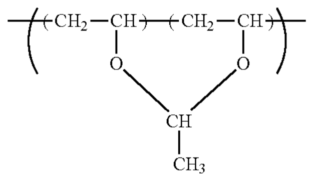

-continued

Structural formula (4)

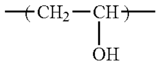

The resin containing the structural unit represented by Structural formula (3) in addition to the structural unit represented by Structural formula (1) improves the bending strength of a pre-sintering object such as a solidified product and a green body derived from a solidified product.

Like the structural unit represented by Structural formula (1), the structural unit represented by Structural formula (3) also has hydrophobicity and improves solubility of the resin in an organic solvent.

From these points of view, the total amount of the structural unit represented by Structural formula (1) and the structural unit represented by Structural formula (3) is preferably 60 mol % or greater, more preferably 65 mol % or greater, yet more preferably 70 mol % or greater, still more preferably 75 mol % or greater, and particularly preferably 80 mol % or greater relative to the total amount of the structural unit represented by Structural formula (1), the structural unit represented by Structural formula (3), and the structural unit represented by Structural formula (4).

The same applies when the resin is free of a structural unit represented by Structural formula (3) or Structural formula (4). The ratio described above may be calculated, regarding the amount of the structural unit not contained in the resin as being zero.

The resin containing the structural unit represented by Structural formula (4) in addition to the structural unit represented by Structural formula (1) has an improved affinity with metal particles contained in a layer of a powder to which the object forming liquid is applied, by means of a hydroxyl group of the structural unit represented by Structural formula (4). This better improves the bending strength of a pre-sintering object such as a solidified product and a green body derived from a solidified product, and better improves the density of the pre-sintering object and the density of a post-sintering object.

From these points of view, the amount of the structural unit represented by Structural formula (4) in the resin is preferably 5 mol % or greater, more preferably 15 mol % or greater, and yet more preferably 25 mol % or greater relative to the total amount of the structural unit represented by Structural formula (1), the structural unit represented by Structural formula (3), and the structural unit represented by Structural formula (4).

However, the structural unit represented by Structural formula (4) has hydrophilicity. Therefore, when the ratio of the structural unit represented by Structural formula (4) becomes higher, the resin containing the structural unit represented by Structural formula (1) cannot have an improved solubility when the object forming liquid contains an organic solvent is suppressed, and cannot better suppress the viscosity of the object forming liquid.

From this point of view, the amount of the structural unit represented by Structural formula (4) in the resin is preferably 40 mol % or less, more preferably 35 mol % or less, yet more preferably 30 mol % or less, still more preferably 25 mol % or less, and particularly preferably 20 mol % or less relative to the total amount of the structural unit represented by Structural formula (1), the structural unit represented by Structural formula (3), and the structural unit represented by Structural formula (4).

The same applies when the resin is free of a structural unit represented by Structural formula (3). The ratio described above may be calculated, regarding the amount of the structural unit not contained in the resin as being zero.

Specific examples of the resin containing the structural unit represented by Structural formula (1) include polyvinyl acetate resins, partially saponified polyvinyl acetate resins, and polyvinyl butyral resins. Among these resins, polyvinyl acetate resins and predetermined partially saponified polyvinyl acetate resins are preferable because these resins can suppress the viscosity of the object forming liquid.

Here, it is preferable that a predetermined partially saponified polyvinyl acetate resin represent a partially saponified polyvinyl acetate resin in which the amount of the structural unit represented by Structural formula (1) is 75 mol % or greater, preferably 80 mol % or greater relative to the total amount of the structural unit represented by Structural formula (1) and the structural unit represented by Structural formula (4).

These resins may be used alone or two or more of these resins may be used in combination. Commercially available products and synthesized products may both be used.

In the present disclosure, a polyvinyl acetate resin is a resin containing the structural unit represented by Structural formula (1) but substantially free of the structural unit represented by Structural formula (3) and the structural unit represented by Structural formula (4). A partially saponified polyvinyl acetate resin is a resin containing the structural unit represented by Structural formula (1) and the structural unit represented by Structural formula (4) but substantially free of the structural unit represented by Structural formula (3). A polyvinyl butyral resin is a resin containing the structural unit represented by Structural formula (1) and the structural unit represented by Structural formula (3), or a resin containing the structural unit represented by Structural formula (1), the structural unit represented by Structural formula (3), and the structural unit represented by Structural formula (4).

A partially saponified polyvinyl acetate resin is a resin obtained by partially saponifying a polyvinyl acetate resin. In a partially saponified polyvinyl acetate resin of the present disclosure, the amount of the structural unit represented by Structural formula (4) is 40 mol % or less, preferably 35 mol % or less, more preferably 30 mol % or less, yet more preferably 25 mol % or less, and still more preferably 20 mol % or less relative to the total amount of the structural unit represented by Structural formula (1) and the structural unit represented by Structural formula (4). In other words, a partially saponified polyvinyl acetate resin of the present disclosure has a degree of saponification of 40 or less, preferably 35 or less, more preferably 30 or less, yet more preferably 25 or less, and still more preferably 20 or less.

The content of the resin containing the structural unit represented by Structural formula (1) is preferably 5.0% by mass or greater, more preferably 7.0% by mass or greater, yet more preferably 10.0% by mass or greater, and particularly preferably 11.0% by mass or greater, and is preferably 30.0% by mass or less, more preferably 25.0% by mass or less, and yet more preferably 20.0% by mass or less relative to the mass of the object forming liquid. When the content of the resin containing the structural unit represented by Structural formula (1) is 5.0% by mass or greater, the bending strength of a pre-sintering object such as a solidified product and a green body derived from a solidified product is better improved. When the content of the resin containing the structural unit represented by Structural formula (1) is 30.0% by mass or less, the viscosity of the object forming liquid is better suppressed and the object forming liquid can be appropriately discharged by an inkjet method.

The resin in which the total amount of the structural unit represented by Structural formula (1) and the structural unit represented by Structural formula (3) is 95 mol % or greater relative to the total amount of the structural unit represented by Structural formula (1), the structural unit represented by Structural formula (3), and the structural unit represented by Structural formula (4) has an improved solubility in an organic solvent and suppresses the viscosity of the object forming liquid. Therefore, it is possible to add the resin in the object forming liquid by a high mass (for example, 15.0% by mass or greater or 20.0% by mass or greater relative to the mass of the object forming liquid). This better improves the bending strength of a pre-sintering object such as a solidified product and a green body derived from a solidified product.

The amount (mol %) of the structural unit represented by each Structural formula in the resin can be obtained by, for example, the polyvinyl alcohol testing method described in JIS-K6276-1994.

—Resin Containing a Structural Unit Represented by Structural Formula (2)—

The resin containing the structural unit represented by Structural formula (2) is deployed in a layer of a powder when the object forming liquid is applied to the layer of the powder containing metal particles and functions as a binder that binds the metal particles with each other in a region to which the object forming liquid is applied through an appropriate heating step suited to the softening point of the resin, to form a pre-sintering object such as a solidified product and a green body derived from a solidified product. The pre-sintering object is formed of a resin containing the structural unit represented by Structural formula (2) having a five-membered-ring lactam structure having a high affinity with a metal. Therefore, the metal particles are strongly bound with each other and improve the bending strength of the object.

The resin containing the structural unit represented by Structural formula (2) achieves an excellent thermal decomposability when the temperature elevation profile is appropriately controlled. Therefore, the resin containing the structural unit represented by Structural formula (2) is appropriately removed in the degreasing step, and a sintered body produced through the subsequent sintering step has an improved density. Hence, when metal particles, which are a material assumed being sintered or preferred being sintered, are used as the material for forming an object as in the present disclosure, the effect to be obtained is remarkable. Specifically, it is preferable that the resin containing the structural unit represented by Structural formula (2) be thermally decomposed by 95% by mass or greater, more preferably 97% by mass or greater when subjected to temperature elevation from 30 degrees C. to 550 degrees C.

However, depending on the temperature conditions (for example, heating conditions at 160 degrees C. or higher), the resin containing the structural unit represented by Structural formula (2) forms a crosslinked structure that may suppress the high thermal decomposability effect. Therefore, when metal particles, which are a material assumed being sintered or preferred being sintered, are used as the material for forming an object as in the present disclosure, use of the resin containing the structural unit represented by Structural formula (1) may be preferred to use of the resin containing the structural unit represented by Structural formula (2) in terms of easy handleability.

Because having the five-membered-ring lactam structure, the resin containing the structural unit represented by Structural formula (2) has an improved solubility in a specific organic solvent (mainly, a polar solvent) and can suppress the viscosity of the object forming liquid. This makes it possible to appropriately discharge the object forming liquid by, for example, an inkjet method. Moreover, the resin containing the structural unit represented by Structural formula (2) can better suppress the viscosity of the object forming liquid when used in combination with, for example, a component 1 (e.g., cyclic esters (lactones)) and a component 2 (e.g., glycol diethers) described below, which serve as organic solvents. It is possible to add the resin containing the structural unit represented by Structural formula (2) in the object forming liquid by a high mass (for example, 15.0% by mass or greater relative to the mass of the object forming liquid), because the viscosity of the object forming liquid can be suppressed as described above. This better improves the bending strength of a pre-sintering object such as a solidified product and a green body derived from a solidified product.

The softening point of the resin containing the structural unit represented by Structural formula (2) is preferably 70 degrees C. or higher, more preferably 80 degrees C. or higher, and yet more preferably 90 degrees C. or higher, and preferably 180 degrees C. or lower, more preferably 170 degrees C. or lower, and yet more preferably 160 degrees C. or lower.

The number average molecular weight (Mn) of the resin containing the structural unit represented by Structural formula (2) is preferably 3,000 or greater but 50,000 or less, and more preferably 5,000 or greater but 40,000 or less. When the number average molecular weight (Mn) of the resin containing the structural unit represented by Structural formula (2) is in the range described above, it is possible to satisfy both of improvement of strength and object production accuracy, and suppression of the viscosity of the object forming liquid and increase of the resin concentration in the object forming liquid.

Specific examples of the resin containing the structural unit represented by Structural formula (2) include polyvinyl pyrrolidone resins. Commercially available products and synthesized products may both be used.

The content of the resin containing the structural unit represented by Structural formula (2) is preferably 7.0% by mass or greater, more preferably 10.0% by mass or greater, yet more preferably 11.0% by mass or greater, and particularly preferably 13.0% by mass or greater, and preferably 25.0% by mass or less, more preferably 20.0% by mass or less, and yet more preferably 15.0% by mass or less relative to the mass of the object forming liquid. When the content of the resin containing the structural unit represented by Structural formula (2) is 7.0% by mass or greater, the bending strength of a pre-sintering object such as a solidified product and a green body derived from a solidified product is better improved. When the content of the resin containing the structural unit represented by Structural formula (2) is 25.0% by mass or less, the viscosity of the object forming liquid is better suppressed and the object forming liquid can be appropriately discharged by, for example, an inkjet method.

<Organic Solvent>

The object forming liquid contains an organic solvent. The organic solvent is a liquid component used for maintaining the object forming liquid in a liquid state at normal temperature.

Moreover, it is preferable that the object forming liquid be a nonaqueous object forming liquid by containing an organic solvent.

In the present disclosure, a "nonaqueous object forming liquid" represents an object forming liquid that contains an organic solvent as a liquid component of the object forming liquid and in which the component that has the maximum mass among liquid components is an organic solvent. The content of the organic solvent relative to the content of the liquid components of the object forming liquid is preferably 90.0% by mass or greater and more preferably 95.0% by mass or greater. This is because when the object forming liquid is nonaqueous, the resin containing the structural unit represented by Structural formula (1) particularly has an improved solubility and suppresses the viscosity of the object forming liquid.

A nonaqueous object forming liquid can be paraphrased as an object forming liquid substantially free of water. Hence, even when the material constituting the metal particles is a highly active metal, i.e. a water-reactive material (e.g., aluminum, zinc, and magnesium), the object forming liquid can be applied to the material. As an example, aluminum forms a coating film formed of aluminum hydroxide when aluminum contacts water, leading to a problem that the sintering density of a sintered body is low when the content of water in the object forming liquid is high. This problem can be avoided when an object forming liquid free of water is used. As another example, there is a problem that handling of aluminum is difficult because aluminum emits hydrogen when aluminum contacts water. This problem can also be avoided when an object forming liquid free of water is used.

Examples of the organic solvent include n-octane, m-xylene, Solvent naphtha, diisobutyl ketone, 3-heptanone, 2-octanone, acetyl acetone, butyl acetate, amyl acetate, n-hexyl acetate, n-octyl acetate, ethyl butyrate, ethyl valerate, ethyl caprylate, ethyl octanoate, ethyl acetoacetate, ethyl 3-ethoxypropionate, diethyl oxalate, diethyl malonate, diethyl succinate, diethyl adipate, bis 2-ethylhexyl maleate, triacetin, tributyrin, propylene glycol monomethyl ether acetate, ethylene glycol monobutyl ether acetate, dibutyl ether, 1,2-dimethoxybenzene, 1,4-dimethoxybenzene, diethylene glycol monobutyl ether, diethylene glycol dimethyl ether, triethylene glycol dimethyl ether, 2-methoxy-1-methylethyl acetate, γ-butyrolactone, propylene carbonate, cyclohexanone, and butyl cellosolve. One of these organic solvents may be used alone or two or more of these organic solvents may be used in combination.

When using the resin containing the structural unit represented by Structural formula (1), the organic solvent to be used in combination is not particularly limited. It is preferable to use an organic solvent containing at least one structure selected from the group consisting of an alkoxy group, an ether bond, and an ester bond. It is more preferable to use an organic solvent containing an ether bond. Alkylene glycol dialkyl ethers are particularly preferable. When such an organic solvent as described above is used, the resin containing the structural unit represented by Structural formula (1) has a more improved solubility and can better suppress the viscosity of the object forming liquid. This makes it possible to appropriately discharge the object forming liquid by, for example, an inkjet method.

In the present disclosure, "alkylene glycol dialkyl ethers" are represented by $R_1$—(O—$R_2$)$_m$—$OR_3$, where $R_1$ and $R_3$ are each independently an alkyl group containing 1 or more but 5 or less carbon atoms and may be straight-chained or branched, where the number of carbon atoms is preferably 1 or 2, and $R_2$ is an alkylene group containing 2 or more but 5 or less carbon atoms and may be straight-chained or branched, where the number of carbon atoms is more preferably 2 or 3, and m represents an integer of 1 or greater but 5 or less and is more preferably 2 or 3.

Specific examples of the alkylene glycol dialkyl ethers include diethylene glycol dimethyl ether, triethylene glycol dimethyl ether, diethylene glycol ethyl methyl ether, and diethylene glycol butyl methyl ether. Among these alkylene glycol dialkyl ethers, diethylene glycol dimethyl ether and triethylene glycol dimethyl ether are preferable, and triethylene glycol dimethyl ether is more preferable.

When using the resin containing the structural unit represented by Structural formula (2), it is preferable to use a polar solvent as the organic solvent to be used in combination. Specifically, it is preferable to use at least one kind selected from components 1, which are the group consisting of cyclic esters (lactones), cyclic ketones, and alkylene glycol monoalkyl ethers. It is more preferable to further use at least one selected from components 2, which are the group consisting of alkylene glycol dialkyl ethers, in addition to the at least one kind selected from the components 1. The resin containing the structural unit represented by Structural formula (2) has an improved solubility in these kinds of organic solvents, and can better suppress the viscosity of the object forming liquid. This makes it possible to appropriately discharge the object forming liquid by, for example, an inkjet method. In terms of an improved solubility of the resin containing the structural unit represented by Structural formula (2), the components 1 are preferably the group consisting of cyclic esters (lactones) and cyclic ketones.

When using the resin containing the structural unit represented by Structural formula (2), and using both of at least one kind selected from the components 1 and at least one kind selected from the components 2 as the organic solvents, the mass ratio (components 1/components 2) of the total amount of the components 1 to the total amount of the components 2 is preferably from 60/40 through 100/0. When the mass ratio of the total amount of the components 1 to the total amount of the components 2 is from 60/40 through 100/0, the resin containing the structural unit represented by Structural formula (2) has an improved solubility and can better suppress the viscosity of the object forming liquid.

Specific examples of the components 1, which are the group consisting of cyclic esters (lactones), cyclic ketones, and alkylene glycol monoalkyl ethers, include γ-butyrolactone, propylene carbonate, and cyclohexanone.

Specific examples of the components 2, which are the group consisting of alkylene glycol dialkyl ethers, include diethylene glycol dimethyl ether, triethylene glycol dimethyl ether, diethylene glycol ethyl methyl ether, and diethylene glycol butyl methyl ether. Among these components 2, diethylene glycol dimethyl ether and triethylene glycol dimethyl ether are preferable.

In the present disclosure, "alkylene glycol monoalkyl ethers" are represented by $R_4$—(O—$R_5$)$_n$—OH where $R_4$ represents an alkyl group containing 1 or more but 5 or less carbon atoms and may be straight-chained or branched, $R_5$ represents an alkylene group containing 2 or more but 5 or less carbon atoms and may be straight-chained or branched, and n represents an integer of 1 or greater but 5 or less.

When it is desired to further suppress the viscosity of the object forming liquid, the kind of the organic solvent to be used in combination with the resin is more influential to use of the resin containing the structural unit represented by Structural formula (2) than to use of the resin containing the structural unit represented by Structural formula (1), and there is a need for the selective use of the organic solvents (components 1 and components 2) as described above. Hence, from a point of view that the materials for producing the object forming liquid can be selected from a wide range, use of the resin containing the structural unit represented by Structural formula (1) is preferred to use of the rein containing the structural unit represented by Structural formula (2).

The content of the organic solvent is preferably 60.0% by mass or greater but 95.0% by mass or less and more preferably 70.0% by mass or greater but 95.0% by mass or less relative to the mass of the object forming liquid. When the content of the organic solvent is 60.0% by mass or greater but 95.0% by mass or less, the resin has an improved solubility and can better suppress the viscosity of the object forming liquid. This makes it possible to appropriately discharge the object forming liquid by, for example, an inkjet method. Moreover, the object forming liquid is suppressed from drying in an object forming liquid applying unit, and has an excellent discharging stability.

The mass ratio (organic solvent/resin) of the amount of the organic solvent to the amount of the resin is preferably 75/25 or greater but 95/5 or less. When the mass ratio of the amount of the organic solvent to the amount of the resin is 75/25 or greater, the resin has an improved solubility and can better suppress the viscosity of the object forming liquid. This makes it possible to appropriately discharge the object forming liquid by, for example, an inkjet method. When the mass ratio of the amount of the organic solvent to the amount of the resin is 95/5 or less, the bending strength of a pre-sintering object such as a solidified product and a green body derived from a solidified product is better improved.

The total of the amount of the organic solvent and the amount of the resin is preferably 90.0% by mass or greater, more preferably 95.0% by mass or greater, yet more preferably 99.0% by mass or greater, and still more preferably 99.5% by mass or greater relative to the mass of the object forming liquid. The object forming liquid may be substantially free of any other components than the organic solvent and the resin. An object forming liquid substantially free of any other components than the organic solvent and the resin represents an object forming liquid produced without proactively using any other components than the organic solvent and the resin as the materials, or an object forming liquid in which the content of any other components than the organic solvent and the resin is less than or equal to the limit of detection when measured by a known method among common general technical knowledge.

When the total of the amount of the organic solvent and the amount of the resin is 90.0% by mass or greater relative to the mass of the object forming liquid, the object forming liquid has a high resin content and better improves the bending strength of a pre-sintering object such as a solidified product and a green body derived from a solidified product. The object forming liquid having a low content of or substantially free of any other components than the organic solvent and the resin (any other components being, for example, materials insoluble in the object forming liquid, such as metal particles) has a suppressed viscosity and an improved discharging stability, and also has an improved storage stability.

It is preferable that the viscosity of the organic solvent be low. Specifically, the viscosity of the organic solvent is preferably 5.0 mPa·s or higher but 50.0 mPa·s or lower, and more preferably 8.0 mPa·s or higher but 30.0 mPa·s or lower at 25 degrees C. When the viscosity of the organic solvent is in the range described above, the viscosity of the object forming liquid containing the organic solvent also tends to be low. This stabilizes discharging of the object forming liquid from an object forming liquid applying unit such as an inkjet head, and accurate discharging of the object forming liquid better improves the bending strength, and also the dimensional accuracy of a pre-sintering object such as a solidified product and a green body derived from a solidified product.

The viscosity can be measured according to, for example, JIS K7117.

It is preferable that the boiling point of the organic solvent be high. Specifically, the boiling point of the organic solvent is preferably 150 degrees C. or higher and more preferably 180 degrees C. or higher. When the boiling point of the organic solvent is high when the object forming liquid is discharged by, for example, an inkjet method, the object forming liquid can be suppressed from drying in nozzles or near nozzles, and the resin can be suppressed from precipitating and clogging the nozzles. The organic solvent having a high boiling point is not particularly limited. Examples of the organic solvent having a high boiling point include γ-butyrolactone described above (with a boiling point of 204 degrees C.), propylene carbonate (with a boiling point of 242 degrees C.), cyclohexanone (with a boiling point of 155.6 degrees C.), diethylene glycol dimethyl ether (with a boiling point of 162 degrees C.), and triethylene glycol dimethyl ether (with a boiling point of 216 degrees C.).

<Additives>

The object forming liquid may appropriately contain, for example, a surfactant, an anti-drying agent, a viscosity modifier, a penetrant, a defoaming agent, a pH regulator, an antiseptic, an antifungal agent, a colorant, a preservative, and a stabilizer depending on the intended purpose. Hitherto known materials may be used as these additives.

<Other Components>

—Water—

The object forming liquid is substantially free of water. In the present disclosure, an object forming liquid "substantially free of water" represents an object forming liquid in which the water content is 10.0% by mass or less relative to the mass of the object forming liquid. The water content in the object forming liquid is preferably 5.0% by mass or less, more preferably 3.0% by mass or less, and yet more preferably 1.0% by mass or less, and it is particularly preferable that the object forming liquid be free of water. The resin has an improved solubility in the object forming liquid substantially free of water and can better suppress the viscosity of the object forming liquid. Moreover, formation of hydrogels containing a plenty of water around the resin, and accompanying viscosity increase of the object forming liquid are suppressed. This makes it possible to appropriately discharge the object forming liquid by, for example, an inkjet method. In the present disclosure, "an object forming liquid free of water" represents an object forming liquid produced without proactively using water as the material, or an object forming liquid in which the water content is less than or equal to the limit of detection when measured by a known method among common general technical knowledge.

Moreover, even when the material constituting the metal particles is a highly active metal, i.e. a water-reactive material (e.g., aluminum, zinc, and magnesium), the object forming liquid substantially free of water can be applied to the material. As an example, aluminum forms a coating film formed of aluminum hydroxide when aluminum contacts water, leading to a problem that the sintering density of a sintered body is low when the content of water in the object forming liquid is high. This problem can be avoided when the object forming liquid is free of water. As another example, there is a problem that handling of aluminum is difficult because aluminum emits hydrogen when aluminum contacts water. This problem can also be avoided when the object forming liquid is free of water.

<Method for Producing Object Forming Liquid>

The method for producing the object forming liquid is not particularly limited and may be appropriately selected depending on the intended purpose. Examples of the method include a method of mixing and stirring the materials described above.

<Properties of Object Forming Liquid>

It is preferable that the viscosity of the object forming liquid be low as described above. Specifically, the viscosity of the object forming liquid is preferably 5 mPa·s or higher but 50 mPa·s or lower, more preferably 5 mPa·s or higher but 40 mPa·s or lower, and yet more preferably 5 mPa·s or higher but 30 mPa·s or lower at 25 degrees C. When the viscosity of the object forming liquid is in the range described above, discharging of the object forming liquid from an object forming liquid applying unit such as an inkjet head is stabilized, and accurate discharging of the object forming liquid better improves the bending strength, and also the dimensional accuracy of a pre-sintering object such as a solidified product and a green body derived from a solidified product.

The viscosity can be measured according to, for example, JIS K7117.

The surface tension of the object forming liquid is preferably 40 mN/m or less and more preferably 10 mN/m or greater but 30 mN/m or less at 25 degrees C. When the surface tension of the object forming liquid is 40 mN/m or less, discharging of the object forming liquid from an object forming liquid applying unit such as an inkjet head is stabilized, and accurate discharging of the object forming liquid better improves the bending strength, and also the dimensional accuracy of a pre-sintering object such as a solidified product and a green body derived from a solidified product.

The surface tension can be measured with, for example, DY-300 available from Kyowa Interface Science Co., Ltd.

<<Metal Particles>>

In present disclosure, "metal particles" represent particles used for production of an object and containing a metal as a constituent material. The constituent materials of the metal particles are not particularly limited so long as a metal is included among the constituent materials. The metal particles may contain any other material than a metal, but it is preferable that the main material of the metal particles be a metal. When the main material of the metal particles is a metal, the mass of the metal contained in the metal particles is 50.0% by mass or greater, preferably 60.0% by mass or greater, more preferably 70.0% by mass or greater, yet more preferably 80.0% by mass or greater, and particularly preferably 90.0% by mass or greater relative to the mass of the metal particles.

Examples of the metal serving as a constituent material of the metal particles include magnesium (Mg), aluminum (Al), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), lead (Pd), silver (Ag), indium (In), tin (Sn), tantalum (Ta), tungsten (W), neodymium (Nd), and alloys of these metals. Among these metals, stainless (SUS) steel, iron (Fe), copper (Cu), silver (Ag), titanium (Ti), aluminum (Al), and alloys of these metals are suitably used. Examples of aluminum alloys include $AlSi_{10}Mg$, $AlSi_{12}$, $AlSi_7Mg_{0.6}$, $AlSi_3Mg$, $AlSi_9Cu_3$, SCALMALLOY, $ADC_{12}$, and $AlSi_3$. One of these metals may be used alone or two or more of these metals may be used in combination.

The metal particles can be produced by a known method. Examples of the method for producing the metal particles include a grinding method of applying, for example, compression, impacts, or friction to a solid to break the solid into pieces, an atomizing method of spraying a molten metal and rapidly cooling the resultant to obtain a powder, a precipitation method of precipitating a component dissolved in a liquid, and a gas phase reaction method of vaporizing and crystallizing a material. Among these methods, the atomizing method that can obtain a spherical shape with small particle diameter variation is preferable. Examples of the atomizing method include a water atomizing method, a gas atomizing method, a centrifugal atomizing method, and a plasma atomizing method. Any of these atomizing methods can be suitably used.

A commercially available product may be used as the metal particles. Examples of the commercially available product include pure Al (available from Toyo Aluminium K.K., A1070-30BB), pure Ti (available from Osaka Titanium Technologies Co., Ltd.), SUS316L (available from Sanyo Special Steel Co., Ltd., product name: PSS316L), $AlSi_{10}Mg$ (available from Toyo Aluminium K.K., $Si_{10}MgBB$), $SiO_2$ (available from Tokuyama Corporation, product name: EXCELLICA SE-15K), $AlO_2$ (available from Taimei Chemicals Co., Ltd., product name: TAIMICRON TM-5D), and $ZrO_2$ (available from Tosoh Corporation, product name: TZ-B53).

The volume average particle diameter of the metal particles is not particularly limited, may be appropriately selected depending on the intended purpose, and is preferably 2 micrometers or greater but 100 micrometers or less and more preferably 8 micrometers or greater but 50 micrometers or less. When the volume average particle diameter of the metal particles is 2 micrometers or greater, aggregation of the metal particles is suppressed, making it possible to suppress degradation of the object production efficiency and degradation of handleability of the metal particles. When the average particle diameter of the metal particles is 100 micrometers or less, it is possible to suppress reduction of contact points between the metal particles and increase of voids, and to suppress degradation of the strength of an object.

The particle size distribution of the metal particles is not particularly limited and may be appropriately selected depending on the intended purpose. A sharper particle size distribution is more preferable.

The volume average particle diameter and the particle size distribution of the metal particles can be measured with a known particle diameter measuring instrument. Examples of the known particle diameter measuring instrument include a particle diameter distribution measuring instrument MICROTRAC MT3000II SERIES (available from MicrotracBel Corporation).

A hitherto known method for producing an object uses metal particles containing a metal base material and a coating resin coating the base material, and applies a liquid to the metal particles to make the coating resin express a binder function, to produce an object. In the present disclosure, the object forming liquid contains the resin having the binder function. Hence, the surfaces of the metal particles of the present disclosure need not be coated with a resin. Use of metal particles of which surfaces are not coated with a resin makes it possible to suppress an undesirable solidified product from being formed due to any metal particles being bound with each other by a coating resin through a heating step even if these metal particles are in a powder region to which no liquid is applied (i.e., a non-object forming region). Here, metal particles of which surfaces are not coated with a resin represent metal particles in which a ratio (surface coating ratio) of the surface area of the resin to the surface area of the metal particles is less than 15%. The surface coating ratio may be 0%. The surface coating ratio is measured by, for example, capturing an image of the metal particles, and measuring the ratio (%) of the area of portions coated with a resin to the total area of the surfaces of the metal particles within the range captured in the two-dimensional image. For judgment of the portions coated with a resin, such a method as, for example, elemental mapping by energy dispersive X-ray spectroscopy such as SEM-EDS can be used.

<Powder Containing Metal Particles>

The metal particles described above are used as a powder, which is an aggregate containing a plurality of metal particles. When the object forming liquid is applied to a layer of the powder, an object is produced.

In addition to the metal particles, the powder may contain any other components that are used as needed. Examples of the other components include a filler, a leveling agent, a sintering aid, and polymeric resin particles.

The filler is a material effective for being attached on the surfaces of the metal particles or being filled in the voids between the metal particles. When the filler is used, for example, the powder has an improved fluidity and can include more contact points and less voids between the metal particles. As a result, the strength and dimensional accuracy of an object can be improved.

The leveling agent is a material effective for controlling the wettability on the surface of a layer of the powder. When the leveling agent is used, the object forming liquid has an improved permeability into a layer of the powder and can improve the strength of an object.

The sintering aid is a material effective for improving the sintering efficiency during sintering of an object. When the sintering aid is used, for example, the strength of an object can be improved, the sintering temperature can be lowered, and the sintering time can be shortened.

The polymeric resin particles are a material effective for being attached on the surfaces of the metal particles, and are also referred to as an organic external additive. The average particle diameter of the polymeric resin particles is not particularly limited, and is preferably 0.1 micrometers or greater but 10 micrometers or less and more preferably 0.1 micrometers or greater but 1 micrometer or less.

The angle of repose of the powder is preferably 60 degrees or less, more preferably 50 degrees or less, and yet more preferably 40 degrees or less. When the angle of repose of the powder is 60 degrees or less, the powder can be efficiently and stably placed on a desired position of a support. The angle of repose can be measured with, for example, a powder characteristic measuring instrument (POWDER TESTER PT-N TYPE, available from Hosokawa Micron Corporation).

<<Object Production Kit>>

An object production kit of the present disclosure includes the object forming liquid and the powder described above, and may further include other components such as a removing liquid described below as needed. In the object production kit, it is at least needed that the powder and the object forming liquid be present independently from each other. This is not limited to a case where an object forming liquid storage storing the object forming liquid and a powder storage storing the powder are integrated with each other. For example, even if the object forming liquid and the powder are stored in independent storages respectively, a case assuming combined use of the powder and the object forming liquid, and a case substantially guiding a user to combined use of the powder and the object forming liquid are encompassed within the object production kit.

<<Object Producing Method>>

An object producing method of the present disclosure includes a powder layer forming step of forming a layer of a powder containing metal particles, an object forming liquid applying step of applying an object forming liquid to the layer of the powder, and a layer laminating step of sequentially repeating the powder layer forming step and the object forming liquid applying step to form a laminate.

The object producing method may further include a heating step of heating the laminate to form a solidified product, an excessive powder removing step of removing an excessive powder, which is the powder adhering to the solidified product, to obtain a green body, a drying step of drying the green body to remove a liquid component remaining in the green body, a degreasing step of heating the green body to remove, for example, a resin derived from the object forming liquid applied, to obtain a degreased body, a sintering step of heating the degreased body to obtain a sintered body, and a post-treatment step of applying a post-treatment to the sintered body.

Each step will be described in detail below.

<Powder Layer Forming Step>

The object producing method includes a powder layer forming step of forming a layer of a powder containing metal particles. The layer of the powder is formed on a support (object forming stage). The method for placing the powder on the support and forming a thin layer of the powder is not particularly limited and may be appropriately selected depending on the intended purpose. Examples of the method include a method using, for example, a known counter rotating mechanism (counter roller) employed in a selective laser sintering method described in Japanese Patent No. 3607300, a method for spreading a powder using such a member as a brush, a roller, and a blade, a method for pressing the surface of a powder with a pressing member to spread the powder, and a method using a known additive manufacturing apparatus.

Formation of a powder layer using a powder layer forming unit such as a counter rotating mechanism (counter roller), a brush, a blade, and a pressing member can be performed in the manner described below.

That is, the counter rotating mechanism (counter roller), the brush, the roller, or the blade, or the pressing member places a powder on a support that is disposed within an outer frame (may also be referred to as, for example, "mold", "hollow cylinder", or "tubular structure") in a manner that the support can move upward and downward while sliding against the inner wall of the outer frame. When a support that can move upward and downward within the outer frame is used as the support, the powder is placed on the support, which is disposed at a position slightly lower than the upper-end opening of the outer frame, i.e. at a position lower by an amount corresponding to the thickness of one powder layer. In the way described above, a thin layer of the powder can be placed on the support.

The thickness of a powder layer is not particularly limited, and may be appropriately selected depending on the intended purpose. The average thickness per layer is preferably 30 micrometers or greater but 500 micrometers or less and more preferably 60 micrometers or greater but 300 micrometers or less.

When the average thickness of a powder layer is 30 micrometers or greater, a solidified product formed by applying an object forming liquid to the powder has an improved strength and can be suppressed from a shape collapse that may occur in a subsequent step such as a sintering step. When the average thickness of a powder layer is 500 micrometers or less, an object derived from a solidified product formed by applying an object forming liquid to the powder has an improved dimensional accuracy.

The average thickness can be measured by a known method that is not particularly limited.

The powder supplied by the powder layer forming unit may be stored in a powder storage. The powder storage is a member such as a container storing a powder. Examples of the powder storage include a storing tank, a bag, a cartridge, and a tank.

<Object Forming Liquid Applying Step>

The object producing method includes an object forming liquid applying step of applying an object forming liquid to the layer of the powder. As the method for applying the object forming liquid to the layer of the powder, a method of discharging the object forming liquid is preferable. The method for discharging the object forming liquid is not particularly limited and may be appropriately selected depending on the intended purpose. Examples of the method include a dispenser method, a spray method, and an inkjet method. Among these methods, the dispenser method has excellent liquid droplet quantitativity, but has a small coating area coverage. The spray method can form a minute jet of materials easily and has a wide coating area coverage and excellent coatability, but has a poor liquid droplet quantitativity and has scattering of the object forming liquid due to a spray current. Hence, the inkjet method is preferable. The inkjet method is preferable because the inkjet method has a liquid droplet quantitativity better than the liquid droplet quantitativity of the spray method, has a coating area coverage greater than the coating area coverage of the dispenser method, and can form a complicated object with a good accuracy efficiently.

When using the inkjet method, the object forming liquid applying unit configured to apply the object forming liquid by discharging the object forming liquid is an inkjet head including nozzles through which the object forming liquid is discharged. As the inkjet head, an inkjet head of a known inkjet printer can be suitably used. Examples of the inkjet head of an inkjet printer include an industrial inkjet RICOH MH/GH SERIES available from Ricoh Company, Ltd. Examples of the inkjet printer include SG7100 available from Ricoh Company, Ltd.

The object forming liquid supplied to the object forming liquid applying unit may be stored in an object forming liquid storage. The object forming liquid storage is a member such as a container storing the object forming liquid. Examples of the object forming liquid storage include a storing tank, a bag, a cartridge, and a tank.

<Layer Laminating Step>

The object producing method includes a layer laminating step of sequentially repeating the powder layer forming step and the object forming liquid applying step to form a laminate. A "laminate" is a structure in which a plurality of powder layers each including a region to which the object forming liquid is applied are laminated. Here, the structure needs not internally include a stereoscopic object retained in a certain stereoscopic shape, or may internally include a stereoscopic object retained in a certain stereoscopic shape.

The layer laminating step includes a step (powder layer forming step) of placing a powder in the form of a thin layer, and a step (object forming liquid applying step) of applying the object forming liquid to the thin layer, and forms a region to which the object forming liquid is applied in the layer of the powder through these steps. The layer laminating step further includes a step (powder layer forming step) of placing (laminating) the powder in the form of a thin layer in the same manner as described above on the thin layer, which is the layer of the powder including the region to which the object forming liquid is applied, and a step (object forming liquid applying step) of applying the object forming liquid to the thin layer, and forms a region to which the object forming liquid is applied in the newly laminated layer of the powder through these steps. The region to which the object forming liquid is applied in the topmost laminated thin layer of the powder is continuous from the region to which the object forming liquid is applied in the underlying thin layer of the powder. Hence, an object forming liquid-applied region having the thickness of two layers of the powder is obtained.

<Heating Step>

It is preferable that the object producing method include a heating step of heating the laminate to form a solidified product. Something that has "solidified" represents something that has become retained in a certain shape. A "solidified product" is a structure including a stereoscopic object retained in a certain stereoscopic shape. A solidified product represents a product that has not yet undergone an excessive powder removing step of removing an excessive powder, which is a powder that does not constitute the stereoscopic object.

The heating temperature in the heating step is preferably higher than the softening point of the resin. At such a heating temperature, the resin can function as a binder that binds the metal particles with each other in the region to which the object forming liquid is applied, and form a pre-sintering object such as a solidified product and a green body derived from the solidified product.

The heating unit is not particularly limited. Examples of the heating unit include a drying device, and a thermo-humidistat.

<Excessive Powder Removing Step>

It is preferable that the object producing method include an excessive powder removing step of removing an excessive powder, which is the powder adhering to the solidified product, to obtain a green body. A "green body" is a stereoscopic object that is retained in a certain stereoscopic shape and has undergone the excessive powder removing step of removing an excessive powder, which is a powder that does not constitute the solidified product. A "green body" preferably represents a stereoscopic object to which no excessive powder is substantially adhering. In the present disclosure, an object forming portion having undergone the heating step may be referred to as "green body (unsintered body)", an object forming portion having undergone the degreasing step may be referred to as "degreased body", and an object forming portion having undergone the sintering step may be referred to as "sintered body".

It is preferable that the excessive powder removing step include either or both of a step of removing an excessive powder from the solidified product by air blowing, and a step of removing an excessive powder from the solidified product by immersion in a removing liquid. It is more preferable that the excessive powder removing step include both of the steps.

The solidified product obtained through the heating step is in a state of being buried in an excessive powder, which is the powder to which the object forming liquid is not applied. When the solidified product is taken out from the buried state, an excessive powder is adhering to the surface or the interior of the solidified product. It is difficult to remove the excessive powder adhering to these portions. When the surface shape of the solidified product is complicated or the internal structure of the solidified product is like a flow path, it is even more difficult to remove the excessive powder. Because a pre-sintering object produced by a typical binder jetting method does not have a high strength, there is a risk that the object may collapse when the air blowing pressure by a wind sending unit is high.

On the other hand, the solidified product formed using the object forming liquid of the present disclosure and formed of the resin described above has an improved bending strength and a strength with which the solidified product can endure the air blowing pressure. Here, the strength of the solidified product, expressed by a three-point bending stress, is preferably 3 MPa or higher and more preferably 5 MPa or higher.

—Removing Liquid—

The removing liquid contains, for example, an organic solvent, and further contains other components as needed. In order to distinguish between the organic solvent contained in the object forming liquid and the organic solvent contained in the removing liquid, the organic solvent contained in the object forming liquid may be referred to as a first organic solvent, and the organic solvent contained in the removing liquid may be referred to as a second organic solvent.

Examples of the organic solvent include ketones, halogens, alcohols, esters, ethers, hydrocarbons, glycols, glycol ethers, glycol esters, pyrrolidone, amides, amines, and carbonates.

Examples of the ketones include acetone, methyl ethyl ketone, diethyl ketone, methyl propyl ketone, methyl isobutyl ketone, methyl amyl ketone, cyclohexanone, isophorone, acetophenone, and diacetone alcohol.

Examples of the halogens include methylene chloride, trichloroethylene, perchloroethylene, HCFC141-b, HCFC-225, 1-bromopropane, chloroform, and orthodichlorobenzene.

Examples of the alcohols include methanol, ethanol, butanol, isobutanol, isopropyl alcohol, normal propyl alcohol, tertiary butanol, secondary butanol, 1,3-butanediol, 1,4-butanediol, 2-ethylhexanol, and benzyl alcohol.

Examples of the esters include methyl acetate, ethyl acetate, butyl acetate, isobutyl acetate, sec butyl acetate, methoxybutyl acetate, 3-methoxybutyl acetate, 3-methoxy-3 methylbutyl acetate, ethyl-3-ethoxypropionate, amyl acetate, normal propyl acetate, isopropyl acetate, methyl lactate, ethyl lactate, butyl lactate, propylene glycol monomethyl ether acetate, propylene glycol monomethyl ether propionate, ethyl 3-ethoxypropionate, and dibasic acid ester (DBE).

Examples of the ethers include dimethyl ether, ethyl methyl ether, diethyl ether, ethylene oxide, tetrahydrofuran, furan, benzofuran, diisopropyl ether, methyl cellosolve, ethyl cellosolve, butyl cellosolve, 1,4-dioxane, methyl tert-butyl ether (MTBE), ethylene glycol dimethyl ether, diethylene glycol dimethyl ether, ethylene glycol diethyl ether, diethylene glycol diethyl ether, triethylene glycol dimethyl ether, diethylene glycol dibutyl ether, dipropylene glycol dimethyl ether, and dipropylene glycol monomethyl ether.

Examples of the hydrocarbons include benzene, toluene, xylene, Solvent naphtha, normal hexane, isohexane, cyclohexane, ethyl cyclohexane, methyl cyclohexane, cyclohexene, cycloheptane, cyclopentane, heptane, pentamethyl benzene, pentane, methyl cyclopentane, normal heptane, isooctane, normal decane, normal pentane, isopentane, mineral spirits, dimethyl sulfoxide, and linear alkylbenzene.

Examples of the glycols include ethylene glycol, diethylene glycol, triethylene glycol, propylene glycol, and dimethoxytetraethylene glycol.

Examples of the glycol esters include ethylene glycol monoethyl ether acetate and diethylene glycol monobutyl ether acetate.

Examples of the glycol ethers include methyl carbitol, ethyl carbitol, butyl carbitol, and methyl triglycol.

Examples of the pyrrolidones include 2-pyrrolidone, N-ethyl-2-pyrrolidone, and N-methyl-2-pyrrolidone.

Examples of the amides include dimethyl formamide, dimethyl acetamide, and formamide.

Examples of the amines include tetramethyl ethylene diamine, N,N-diisopropyl ethyl amine, ethylene diamine, triethyl amine, diethyl amine, aniline, pyrrolidine, piperidine, morpholine, pyrrole, pyridine, pyridazine, oxazole, thiazole, and 1,3-dimethyl-2-imidazolidinone.

Examples of the carbonate include diethyl carbonate, dimethyl carbonate, propylene carbonate, and ethyl methyl carbonate.

As the other components, additives such as a surfactant, a defoaming agent, an antiseptic/antifungal agent, a pH regulator, a chelate agent, and an anticorrosive agent may be added.

<Drying Step>

It is preferable that the object producing method include a drying step of drying the green body to remove a liquid component remaining in the green body, such as the removing liquid.

In the drying step, not only a liquid component such as the removing liquid, but also an organic substance contained in the green body may be removed. As the drying unit, for example, a known drying device, and a known thermo-humidistat may be used.

<Degreasing Step>

It is preferable that the object producing method include a degreasing step of heating the green body to remove, for example, a resin derived from the object forming liquid applied, to obtain a degreased body. A "degreased body" is a stereoscopic object obtained by degreasing an organic substance such as the resin from the green body.

In the degreasing step, using a degreasing unit, the green body is heated for a predetermined time (e.g., for from one hour through ten hours) at a temperature that is higher than or equal to the thermal decomposition temperature of the organic substance such as the resin and lower than the melting point or the solidus line temperature of the material (metal) constituting the metal particles (e.g., about 570 degrees C. when $AlSi_{10}Mg$ particles are used), to decompose and remove the organic substance. Examples of the degreasing unit include a known sintering furnace and a known electric furnace.

<Sintering Step>

It is preferable that the object producing method include a sintering step of heating the degreased body to obtain a sintered body. A "sintered body" is a stereoscopic object formed through integration of the metal material constituting the metal particles, and produced by sintering the degreased body.

In the sintering step, using a sintering unit, the degreased body is heated for a predetermined time (e.g., for from one hour through ten hours) at a temperature that is higher than or equal to the solidus line temperature of the metal material constituting the metal particles (e.g., about 570 degrees C. when $AlSi_{10}Mg$ particles are used) and lower than or equal to the liquidus line temperature (e.g., about 600 degrees C. when $AlSi_{10}Mg$ particles are used), to integrate the metal material constituting the metal particles. Examples of the sintering unit include a known sintering furnace. The sintering unit may be the same unit as the degreasing unit described above. The degreasing step and the sintering step may be performed continuously.

<Post-Treatment Step>

It is preferable that the object producing method include a post-treatment step of applying a post-treatment to the sintered body. The post-treatment step is not particularly limited and may be appropriately selected depending on the intended purpose. Examples of the post-treatment step include a surface protection treatment step and a painting step.

<Object Production Flow>

The object production flow of the object producing method of the present disclosure will be described with reference to FIG. 1A to FIG. 1E. FIG. 1A to FIG. 1E are schematic views illustrating an example of the operation of an object producing apparatus.

First, the description will be started from a state in which a first powder layer 30 has been formed on an object forming stage of an object forming tank. When forming the next powder layer on the first powder layer 30, a supplying stage 23 of a supplying tank is moved upward, and the object forming stage 24 of the object forming tank is moved downward as illustrated in FIG. 1A. Here, the distance by which the object forming stage 24 is moved downward is set in a manner that the interval (layer lamination pitch) between the upper surface of the powder layer in the object forming tank 22 and the lower portion (lower tangential portion) of a flattening roller 12 is Δt1. The interval Δt1 is not particularly limited, and is preferably about from several tens of micrometers through 100 micrometers.

In the present disclosure, the flattening roller 12 is disposed in a manner to have a gap from the upper-end surfaces of the supplying tank 21 and the object forming tank 22. Therefore, when the flattening roller 12 is conveying and supplying the powder 20 into the object forming tank 22 and flattening the powder, the upper surface of the powder layer is at a position higher than the upper-end surfaces of the supplying tank 21 and the object forming tank 22. This makes it possible to securely prevent the flattening roller 12 from contacting the upper-end surfaces of the supplying tank 21 and the object forming tank 22 and to reduce damages of the flattening roller 12. When the surface of the flattening roller 12 is damaged, the flattening roller 12 tends to generate streaks in the surface of a layer 31 (see FIG. 1D) of the powder supplied into the object forming tank 22 and reduce flatness of the layer.

Figure 1B:
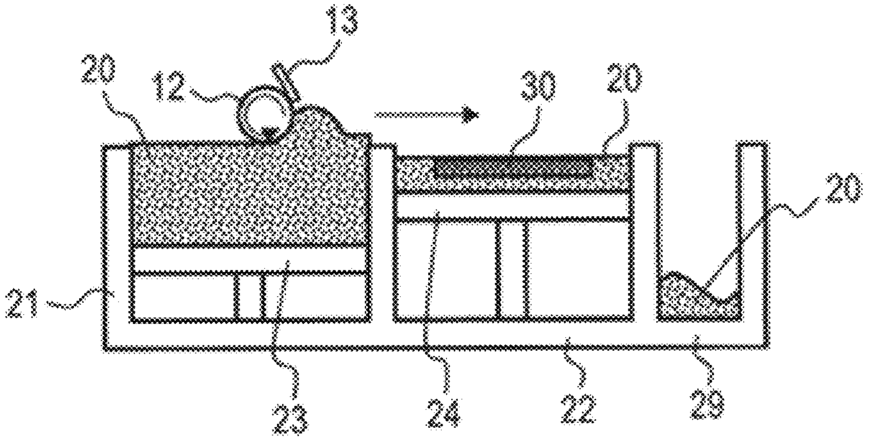
FIG. 1B is a schematic view illustrating another example of an operation of a three-dimensional object producing apparatus.
Figure 1C:
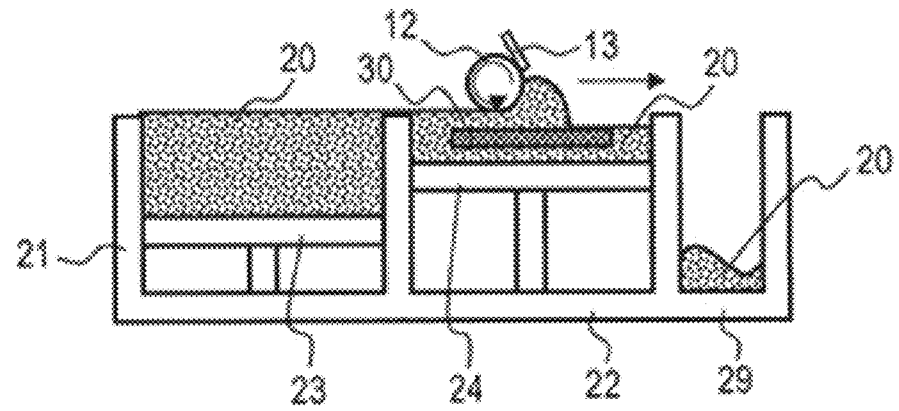
FIG. 1C is a schematic view illustrating another example of an operation of a three-dimensional object producing apparatus.
Figure 1D:
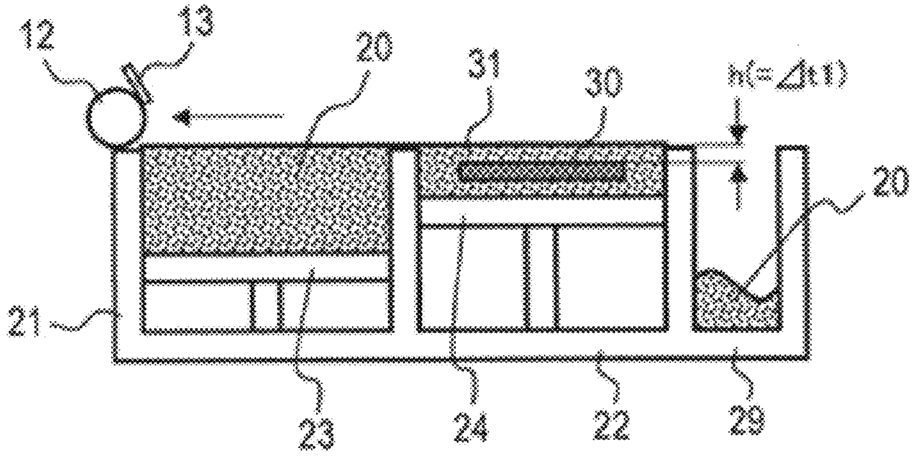
FIG. 1D is a schematic view illustrating another example of an operation of a three-dimensional object producing apparatus.

Next, as illustrated in FIG. 1B, the flattening roller 12 rotates in the direction of the arrow and moves the powder 20, which is placed at a position higher than the upper-end surface of the supplying tank 21, to the object forming tank 22 side, to convey and supply the powder 20 into the object forming tank 22 (powder supplying). Then, as illustrated in FIG. 1C, the flattening roller 12 moves in parallel with the stage surface of the object forming stage 24 of the object forming tank 22, and forms a powder layer 31 having a predetermined thickness Δt1 on the object forming stage 24 of the object forming tank 22 (flattening). Here, any excessive powder 20 left unused for forming the powder layer 31 falls into an excessive powder receiving tank 29. After the powder layer 31 is formed, the flattening roller 12 moves to the supplying tank 21 side and returns to the initial position (home position) as illustrated in FIG. 1D.

Here, the flattening roller 12 can move while maintaining a constant distance from the upper-end surfaces of the object forming tank 22 and the supplying tank 21. Because the flattening roller 12 can move while maintaining a constant distance, the flattening roller 12 can form a powder layer 31 having a uniform thickness h (corresponding to the layer lamination pitch Δt1) on the object forming tank 22 or an already formed solidified layer 30 along with conveying the powder 20 to the object forming tank 22. In the following description, the thickness h of the powder layer 31 and the layer lamination pitch Δt1 may be described without distinction, but mean the same thickness and the same meaning unless otherwise particularly specified. The thickness h of the powder layer 31 may be obtained by actual measurement. In this case, an average obtained from a plurality of positions is preferable.

Figure 1E:
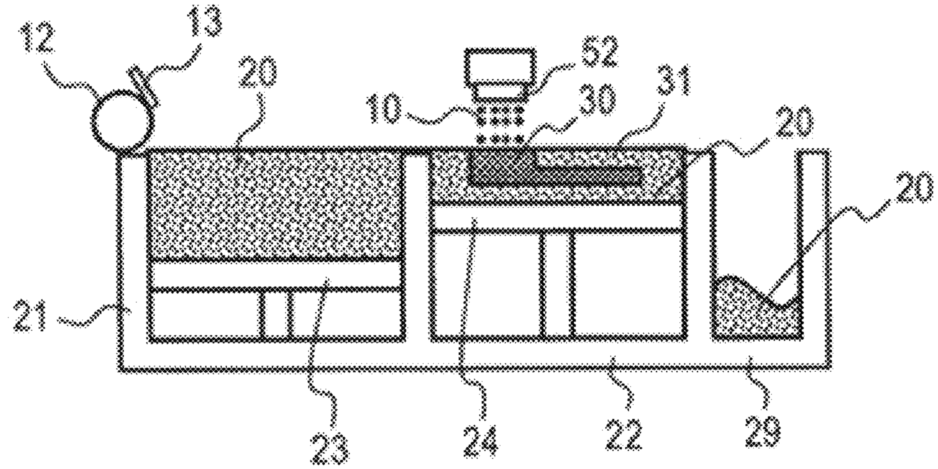
FIG. 1E is a schematic view illustrating another example of an operation of a three-dimensional object producing apparatus.

Subsequently, as illustrated in FIG. 1E, a head 52 of a liquid discharging unit discharges liquid droplets 10 of the object forming liquid to laminate and form an object forming liquid-applied layer 30 having a desired shape in the next powder layer 31. Next, the powder layer forming step and the object forming liquid applying step described above are repeated, to newly form and laminate an object forming liquid-applied region 30. Here, the new object forming liquid-applied region 30 and the underlying object forming liquid-applied region 30 integrate with each other. Afterwards, the powder layer forming step and the object forming liquid applying step are further repeated, to complete a laminate.

EXAMPLES

The present disclosure will be described below by way of Examples. The present disclosure should not be construed as being limited to these Examples.

<Preparation of Object Forming Liquid>

Examples 1 to 9 and Comparative Examples 1 to 6

The materials described in Tables 1 to 2 were mixed, and stirred with a magnetic stirrer for 2 hours while being heated at 80 degrees C. After the materials were stirred for 2 hours and heating was stopped, the resultant was continued being stirred until the temperature became room temperature, to prepare object forming liquids of Examples 1 to 9 and Comparative Examples 1 to 6. The resins used in Examples 1 to 9, Comparative Examples 1 to 3, and Comparative Examples 5 and 6 were soluble in the solvents (e.g., organic solvents) of the respective object forming liquids. The resin used in Comparative Example 4 was not soluble in the solvent (organic solvent) of the object forming liquid.

The unit of the values representing the contents of the materials in Tables 1 and 2 is percent by mass. The content of the resin represents the total amount, not the amount of a solid.

The materials in Tables 1 to 2 below represent the followings. The "ratio of a hydrophobic moiety in the resin" described below represents the ratio of the total amount of the structural unit represented by Structural formula (1) and the structural unit represented by Structural formula (3) to the total amount of the structural unit represented by Structural formula (1), the structural unit represented by Structural formula (3), and the structural unit represented by Structural formula (4) in the resin. The "ratio of a hydrophilic moiety in the resin" described below represents the ratio of the amount of the structural unit represented by Structural formula (4) to the total amount of the structural unit represented by Structural formula (1), the structural unit represented by Structural formula (3), and the structural unit represented by Structural formula (4) in the resin.

—JMR-7LO (Polyvinyl Acetate, Obtained from Japan Vam & Poval Co., Ltd.)—

Structural Formula

Structural formula (5)

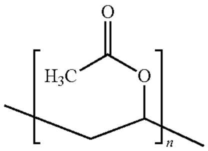

Ratio of a hydrophobic moiety in the resin: from 98 mol % through 100 mol %

Ratio of a hydrophilic moiety in the resin: from 0 mol % through 2 mol % (The structural unit represented by Structural formula (4) in the resin may be possibly contained in a small amount for expediency of production, and is not a structural unit to be proactively contained. Hence, the resin is regarded as being substantially free of the structural unit represented by Structural formula (4).)

Tg: from 30 degrees C. through 40 degrees C.

Softening point: about 100 degrees C.

Number average molecular weight (Mn): 20,000 or less

Component concentration: 99% by mass or higher

—JMR-10LL (Partially Saponified Polyvinyl Acetate, Obtained from Japan Vam & Poval Co., Ltd.)—

Structural Formula

Structural formula (6)

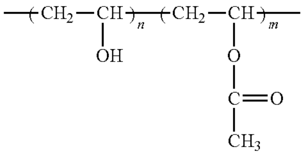

Ratio of a hydrophobic moiety in the resin: from 89 mol % through 91 mol %

Ratio of a hydrophilic moiety in the resin: from 9 mol % through 11 mol %

Tg: from 30 degrees C. through 40 degrees C.

Softening point: about 105 degrees C.

Number average molecular weight (Mn): 20,000 or less

Component concentration: 99% by mass or higher

—JMR-10L (Partially Saponified Polyvinyl Acetate, Obtained from Japan Vam & Poval Co., Ltd.)—

Structural Formula

Structural formula (6)

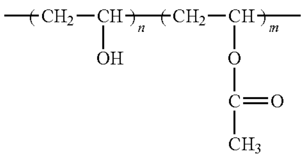

Ratio of a hydrophobic moiety in the resin: 65 mol %

Ratio of a hydrophilic moiety in the resin: 35 mol %

Tg: from 30 degrees C. through 40 degrees C.

Softening point: about 110 degrees C.

Number average molecular weight (Mn): 25,000 or less

Component concentration: 99% by mass or higher

—ESLEC BL-10 (Polyvinyl Butyral, Obtained from Sekisui Chemical Co., Ltd.)—

Structural Formula

Structural formula (7)

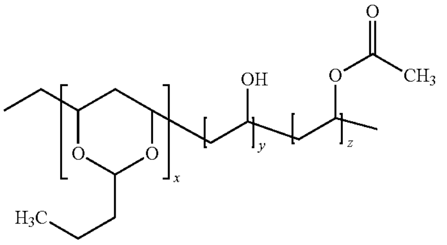

Ratio of a hydrophobic moiety in the resin: 72 mol % (3 mol % of the structural unit represented by Structural formula (1) and 69 mol % of the structural unit represented by Structural formula (3))

Ratio of a hydrophilic moiety in the resin: 28 mol %

Tg: 67 degrees C.

Softening point: from 100 degrees C. through 120 degrees C.

Number average molecular weight (Mn): about 15,000

Component concentration: 99% by mass or higher

—PVP K15 (Polyvinyl Pyrrolidone, Obtained from FUJIFILM Wako Pure Chemical Corporation)—

Structural Formula

Structural formula (8)

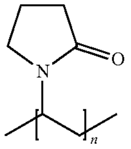

Ratio of a hydrophobic moiety in the resin: incalculable because the resin was free of the structural units represented by Structural formulae (1), (3), and (4) (expressed as "—" in Tables 1 and 2 below)

Ratio of a hydrophilic moiety in the resin: incalculable because the resin was free of the structural units represented by Structural formulae (1), (3), and (4) (expressed as "—" in Tables 1 and 2 below)

Softening point: from 100 degrees C. through 130 degrees C.

Number average molecular weight (Mn): about 10,000 or less

Component concentration: 90% by mass or higher

—PVP K25 (Polyvinyl Pyrrolidone, Obtained from FUJIFILM Wako Pure Chemical Corporation)—

Structural Formula

Structural formula (8)

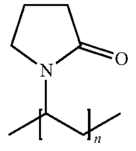

Ratio of a hydrophobic moiety in the resin: incalculable because the resin was free of the structural units represented by Structural formulae (1), (3), and (4) (expressed as "—" in Tables 1 and 2 below)

Ratio of a hydrophilic moiety in the resin: incalculable because the resin was free of the structural units represented by Structural formulae (1), (3), and (4) (expressed as "—" in Tables 1 and 2 below)

Softening point: from 120 degrees C. through 150 degrees C.

Number average molecular weight (Mn): about from 22,000 through 35,000

Component concentration: 95% by mass or higher

—ARAKYD 7036 (Polyester, Obtained from Arakawa Chemical Industries, Ltd.)—

Structural Formula

Structural formula (9)

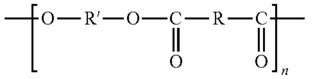

Ratio of a hydrophobic moiety in the resin: incalculable because the resin was free of the structural units represented by Structural formulae (1), (3), and (4) (expressed as "—" in Tables 1 and 2 below)

Ratio of a hydrophilic moiety in the resin: incalculable because the resin was free of the structural units represented by Structural formulae (1), (3), and (4) (expressed as "—" in Tables 1 and 2 below)

Tg: 28 degrees C.

Number average molecular weight (Mn): 14,000

Component concentration: 50% by mass

—IUPIZETA FPC0330 (Polycarbonate, Obtained from Mitsubishi Gas Chemical Company, Inc.)—

Structural Formula

Structural formula (10)

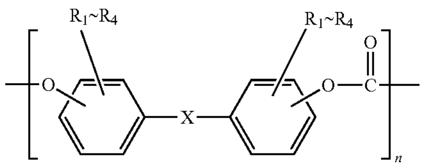

Ratio of a hydrophobic moiety in the resin: incalculable because the resin was free of the structural units represented by Structural formulae (1), (3), and (4) (expressed as "—" in Tables 1 and 2 below)

Ratio of a hydrophilic moiety in the resin: incalculable because the resin was free of the structural units represented by Structural formulae (1), (3), and (4) (expressed as "—" in Tables 1 and 2 below)

Tg: 126 degrees C.

z average molecular weight (Mz): 32,000

Component concentration: 99% by mass or higher

—IUPIZETA RX2136P (Polycarbonate, Obtained from Mitsubishi Gas Chemical Company, Inc.)—

Structural Formula

Structural formula (10)

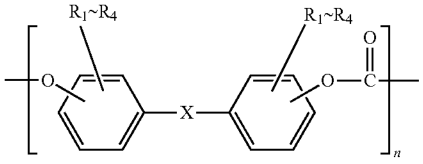

Ratio of a hydrophobic moiety in the resin: incalculable because the resin was free of the structural units represented by Structural formulae (1), (3), and (4) (expressed as "—" in Tables 1 and 2 below)

Ratio of a hydrophilic moiety in the resin: incalculable because the resin was free of the structural units represented by Structural formulae (1), (3), and (4) (expressed as "—" in Tables 1 and 2 below)

Tg: 123 degrees C.

z average molecular weight (Mz): 26,000

Component concentration: 99% by mass or higher

—JC-25 (Polyvinyl Alcohol, Obtained from Japan Vam & Poval Co., Ltd.)—

Structural Formula

Structural formula (11)

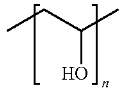

Ratio of a hydrophobic moiety in the resin: 0 mol %

Ratio of a hydrophilic moiety in the resin: 100 mol %

Tg: 67 degrees C.

Number average molecular weight (Mn): 25,000

Component concentration: 99% by mass or higher

—OLICOX KC-1700P (Acrylic, Obtained from Kyoeisha Chemical Co., Ltd.)—

Structural Formula

Structural formula (12)

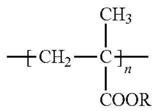

Ratio of a hydrophobic moiety in the resin: incalculable because the resin was free of the structural units represented by Structural formulae (1), (3), and (4) (expressed as "—" in Tables 1 and 2 below)

Ratio of a hydrophilic moiety in the resin: incalculable because the resin was free of the structural units represented by Structural formulae (1), (3), and (4) (expressed as "—" in Tables 1 and 2 below)

Number average molecular weight (Mn): 100,000

Component concentration: 99% by mass or higher

Among the resins described above, the resins used in Examples 1 to 9 all had a characteristic of being thermally decomposed by 95% by mass or greater when subjected to temperature elevation from 30 degrees C. to 550 degrees C.

[Viscosity of Object Forming Liquid]

The viscosity of the object forming liquid at 25 degrees C. was measured with an R-type viscometer (obtained from Toki Sangyo Co., Ltd.) and evaluated according to the evaluation criteria described below. The measurement results and the evaluation results are presented in Tables 1 and 2 below. In Comparative Example 4, measurement and evaluation of the viscosity were not performed because the resin of the object forming liquid was not soluble in the solvent (expressed as "—" in Tables 1 and 2 below).

Evaluation Criteria

A: The viscosity was 5 mPa·s or higher but 20 mPa·s or lower.

B: The viscosity was higher than 20 mPa·s but 50 mPa·s or lower.

C: The viscosity was higher than 50 mPa·s.

<Production of Object (Green Body and Sintered Body)>

Using each object forming liquid prepared and a powder containing metal particles ($AlSi_{10}Mg$ powder (obtained from Toyo Aluminium K.K., Si10Mg-30BB, with a volume average particle diameter of 35 micrometers, the surfaces of the metal particles not coated with a resin), each object (a green body and a sintered body) was produced in the manner described below.

1) First, using a known object producing apparatus as illustrated in FIG. 1A to FIG. 1E, the power was conveyed from a supplying-side powder storing tank to a forming-side powder storing tank, to form a thin layer of the powder having an average thickness of 100 micrometers on a support.

2) Next, the object forming liquid was discharged and applied from nozzles of a known inkjet discharging head to the surface of the formed thin layer of the powder. The region to which the object forming liquid was discharged had a rectangular shape having a size of 70 mm×12 mm.

3) Next, the operations of 1) and 2) described above were repeated until the total average thickness became 5 mm, and thin layers of the powder were sequentially laminated, to form a laminate. Subsequently, the laminate was heated at an appropriate temperature suited to the softening point of the resin contained in each object forming liquid, to form a solidified product.

4) Next, the solidified product was blown with air to remove any excessive powder, and immersed for 1 hour in a hydrocarbon solvent serving as a removing liquid at 25 degrees C., to obtain a green body (unsintered body). Subsequently, the green body was dried being left in an environment in a vacuum at 100 degrees C. for 2 hours.

5) Next, the green body was degreased by heating, to obtain a degreased body. The degreased body was sintered by further heating, to produce a sintered body.

The green body bending strength, the green body density, and the sintered body density of the object obtained through the operations of 1) to 5) described above were measured in the manners described below and evaluated. The results are presented in Tables 1 and 2 below. In Comparative Example 4, because the resin of the object forming liquid was not soluble in the solvent, object production was not performed and the measurements and evaluations were not performed, either (expressed as "—" in Tables 1 and 2 below).

[Green Body Bending Strength]

The bending strength of the green body produced in 4) described above was measured and evaluated according to the evaluation criteria described below. For measurement of the bending strength, a universal tester obtained from Shimadzu Corporation (autograph, model No. AG-I), a 1 kN load cell, and a three-point bending jig were used. Stress when the distance between fulcra was set to 24 mm and the load point was displaced at a speed of 1 mm/minute was plotted with respect to strain. The stress at the breaking point was used as the maximum stress.

Evaluation Criteria

A: The bending strength was 5 MPa or greater.

B: The bending strength was 3 MPa or greater but less than 5 MPa.

C: The bending strength was 2.7 MPa or greater but less than 3 MPa.

D: The bending strength was less than 2.7 MPa.

[Green Body Density]

The density of the green body produced in 4) described above was measured. Next, the ratio of the density of the green body to the density of the metal material constituting the green body was calculated and evaluated according to the evaluation criteria described below.

Evaluation Criteria

A: The ratio of the density of the green body was 55% or higher.

B: The ratio of the density of the green body was 50% or higher but lower than 55%.

C: The ratio of the density of the green body was 47% or higher but lower than 50%.

D: The ratio of the density of the green body was lower than 47%.

[Sintered Body Density]

The density of the sintered body produced in 5) described above was measured. Next, the ratio of the density of the sintered body to the density of the metal material constituting the sintered body was calculated and evaluated according to the evaluation criteria described below.

Evaluation Criteria

A: The ratio of the density of the sintered body was 97% or higher.

B: The ratio of the density of the sintered body was 93% or higher but lower than 97%.

C: The ratio of the density of the sintered body was lower than 93%.

TABLE 1

| | | Ex. | | | | | | | | |
|---|---|---|---|---|---|---|---|---|---|---|
| | | 1 | 2 | 3 | 4 | 5 | 6 | 7 | 8 | 9 |
| Organic solvent (components 1) | γ-Butyrolactone | | | | | | | 87.0 | | 51.0 |
| | Propylene carbonate | | | | | | 85.0 | | | |
| | Cyclohexanone | | | | | | | | 85.0 | |
| | Butyl cellosolve | | | | | | | | | |
| Organic solvent (components 2) | Diethylene glycol dimethyl ether | 88.0 | | 88.0 | 90.0 | 78.0 | | | | 34.0 |
| | Triethylene glycol dimethyl ether | | 88.0 | | | | | | | |
| Organic solvent | 2-Methoxy-1-methylethyl acetate | | | | | | | | | |
| Resin containing structural unit of Structural formula (1) | JMR-7LO (polyvinyl acetate) | 12.0 | | | | 22.0 | | | | |
| | JMR-10LL (partially saponified polyvinyl acetate) | | 12.0 | | | | | | | |
| | JMR-10L (partially saponified polyvinyl acetate) | | | 12.0 | | | | | | |
| | ESLEC BL-10 (polyvinyl butyral) | | | | 10.0 | | | | | |
| Resin containing structural unit of Structural formula (2) | PVP K15 (polyvinyl pyrrolidone) | | | | | | 15.0 | | 15.0 | 15.0 |
| | PVP K25 (polyvinyl pyrrolidone) | | | | | | | 13.0 | | |
| Other resins | ARAKYD 7036 (polyester) | | | | | | | | | |
| | IUPIZETA FPC-0330 (polycarbonate) | | | | | | | | | |
| | IUPIZETA RX2136P (polycarbonate) | | | | | | | | | |
| | JC-25 (polyvinyl alcohol) | | | | | | | | | |
| | OLICOX KC-1700P (acrylic) | | | | | | | | | |
| Water | | | | | | | | | | |
| Total amount [% by mass] | | 100 | 100 | 100 | 100 | 100 | 100 | 100 | 100 | 100 |
| Ratio of hydrophobic moiety in resin [mol %] | | 98-100 | 89-91 | 65 | 72 | 98-100 | — | — | — | — |
| Ratio of hydrophilic moiety in resin [mol %] | | 0-2 | 9-11 | 35 | 28 | 0-2 | — | — | — | — |
| Evaluation result | Viscosity of object forming liquid [mPa · s] | 7 | 15 | 39 | 26 | 16 | 11 | 15 | 12 | 7 |
| | | A | A | B | B | A | A | A | A | A |
| | Green body bending strength [MPa] | 3.1 | 4.3 | 5.6 | 5.4 | 3.9 | 5.0 | 6.2 | 5.3 | 5.4 |
| | | B | B | A | A | B | A | A | A | A |
| | Green Body density[%] | 54 | 59 | 59 | 59 | 54 | 58 | 59 | 59 | 59 |
| | | B | A | A | A | B | A | A | A | A |
| | Sintered body density [%] | 98 | 98 | 99 | 99 | 98 | 99 | 99 | 99 | 99 |
| | | A | A | A | A | A | A | A | A | A |

TABLE 2

| | | Comp. Ex. | | | | | |
|---|---|---|---|---|---|---|---|
| | | 1 | 2 | 3 | 4 | 5 | 6 |
| Organic solvent (components 1) | γ-Butyrolactone | | | | | 10.0 | |
| | Propylene carbonate | | | | | | |
| | Cyclohexanone | | | | | | |
| | Butyl cellosolve | | | | 90.0 | 10.0 | |
| Organic solvent (components 2) | Diethylene glycol dimethyl ether | 76.0 | | | | | |
| | Triethylene glycol dimethyl ether | | 90.0 | 90.0 | | | |
| Organic solvent | 2-Methoxy-1-methylethyl acetate | | | | | | 90.0 |
| Resin containing structural unit of Structural formula (1) | JMR-7LO | | | | | | |
| | JMR-10LL (partially saponified polyvinyl acetate) | | | | | | |
| | JMR-10L (partially saponified | | | | | | |

TABLE 2-continued

| | | Comp. Ex. | | | | | |
|---|---|---|---|---|---|---|---|
| | | 1 | 2 | 3 | 4 | 5 | 6 |
| | polyvinyl acetate) | | | | | | |
| | ESLEC BL-10 (polyvinyl butyral) | | | | | | |
| Resin containing structural unit of Structural formula (2) | PVP K15 | | | | | | |
| | PVP K25 (polyvinyl pyrrolidone) | | | | | | |
| Other resins | ARAKYD 7036 (polyester) | 24.0 | | | | | |
| | IUPIZETA FPC-0330 (polycarbonate) | | 10.0 | | | | |
| | IUPIZETA RX2136P (polycarbonate) | | | 10.0 | | | |
| | JC-25 (polyvinyl alcohol) | | | | 10.0 | 10.0 | |
| | OLICOX KC-1700P (acrylic) | | | | | | 10.0 |
| Water | | | | | | 70.0 | |
| Total amount [% by mass] | | 100 | 100 | 100 | 100 | 100 | 100 |
| Ratio of hydrophobic moiety in resin [mol %] | | — | — | — | 0 | — | — |
| Ratio of hydrophilic moiety in resin [mol %] | | — | — | — | 100 | — | — |
| Evaluation result | Viscosity of object forming liquid [mPa · s] | 14<br>A | 60<br>C | 60<br>C | —<br>— | 48<br>B | 32<br>B |
| | Green body bending strength [MPa] | 2.6<br>D | 0.7<br>D | 0.7<br>D | —<br>— | 4.2<br>B | 1.4<br>D |
| | Green body density[%] | 49<br>C | 49<br>C | 47<br>C | —<br>— | 45<br>D | 51<br>B |
| | Sintered body density [%] | 93<br>B | 75<br>C | 73<br>C | —<br>— | 79<br>C | 99<br>A |

According to Examples 1 to 5, the object forming liquids containing a resin containing the structural unit represented by Structural formula (1) had a low viscosity and were able to improve the green body bending strength, the green body density, and the sintered body density.

According to Examples 1 to 5, the object forming liquids containing a resin containing a hydrophilic moiety in a small amount were able to improve the green body bending strength, the green body density, and the sintered body density. On the other hand, there was a tendency that the viscosity of the object forming liquids containing a resin containing a hydrophilic moiety was high.

According to Example 5, it was possible to suppress the viscosity of the object forming liquid containing a resin having a high hydrophobic moiety ratio, even though the resin content in the object forming liquid was high.

According to Examples 6 to 9, the object forming liquids containing a resin containing the structural unit represented by Structural formula (2) had a low viscosity and were able to improve the green body bending strength, the green body density, and the sintered body density.

According to Example 9, it was possible to better suppress the viscosity of the object forming liquid containing at least one selected from the components 1 and at least one selected from the components 2.

According to Comparative Example 1, the object forming liquid containing a polyester resin had a low viscosity, but it was impossible to improve the green body bending strength and the green body density with this object forming liquid.

According to Comparative Examples 2 and 3, it was impossible to suppress the viscosity of the object forming liquids containing a polycarbonate resin, and it was also impossible to improve the green body bending strength, the green body density, and the sintered body density with these object forming liquids.

According to Comparative Example 4, it was impossible to use polyvinyl alcohol insoluble in a solvent (organic solvent) for production of an object.

According to Comparative Example 5, the aqueous object forming liquid were unable to improve the green body density and the sintered body density.

According to Comparative Example 6, the object forming liquid containing an acrylic resin had a low viscosity but was unable to improve the green body bending strength.

What is claimed is:

1. An object producing method, comprising:

forming a layer of a powder containing metal particles;

applying an object forming liquid to the layer of the powder; and sequentially repeating the forming and the applying to form a laminate, wherein the object forming liquid contains a resin containing at least one structural unit represented by Structural formula (1) below, and an organic solvent which has a water content of 10% by mass or less, Structural formula (1)

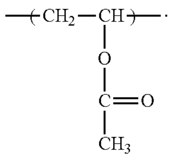

2. The object producing method according to claim 1, wherein in the applying, the object forming liquid is discharged to the layer of the powder by an inkjet method.

3. The object producing method according to claim 1, further comprising:

heating the laminate to form a solidified product; and removing an excessive powder, which is the powder adhering to the solidified product, to obtain a green body.

4. The object producing method according to claim 1, further comprising:

heating the green body to form a degreased body from which the resin is removed; and heating the degreased body to form a sintered body.

5. The object producing method according to claim 1, wherein the resin containing the structural unit represented by the Structural formula (1) comprises at least one selected from the group consisting of polyvinyl acetate resins, partially saponified polyvinyl acetate resins, and polyvinyl butyral resins.

6. The object producing method according to claim 1, wherein a total amount of the structural unit represented by the Structural formula (1) and a structural unit represented by Structural formula (3) below in the resin is 60 mol % or greater relative to a total amount of the structural unit represented by the Structural formula (1), the structural unit represented by the Structural formula (3), and a structural unit represented by Structural formula (4) below, Structural formula (3)

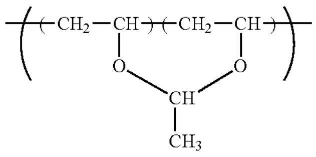

Structural formula (4)

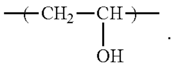

7. The object producing method according to claim 1, wherein the organic solvent contains at least one structure selected from the group consisting of an alkoxy group, an ether bond, and an ester bond.

8. The object producing method according to claim 7, wherein the organic solvent is an alkylene glycol dialkyl ether.

9. The object producing method according to claim 1, wherein the resin further comprises the structural unit represented by the Structural formula (2) below, Structural formula (2)

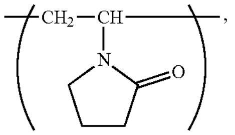

and the organic solvent contains at least one selected from components 1, which are the group consisting of cyclic esters (lactones), cyclic ketones, and alkylene glycol monoalkyl ethers.

10. The object producing method according to claim 9, wherein the organic solvent further contains at least one selected from components 2, which are the group consisting of alkylene glycol dialkyl ethers.

11. The object producing method according to claim 10, wherein a mass ratio (components 1/components 2) of a total amount of the components 1 to a total amount of the components 2 is from 60/40 through 100/0.

12. The object producing method according to claim 1, wherein a mass ratio (organic solvent/resin) of an amount of the organic solvent to an amount of the resin is 75/25 or greater but 95/5 or less.

13. The object producing method according to claim 1, wherein the resin is thermally decomposed by 95% by mass or greater when subjected to temperature elevation from 30 degrees C. to 550 degrees C.

14. The object producing method according to claim 1, wherein a content of the resin is 5.0% by mass or greater but 30.0% by mass or less relative to a mass of the object forming liquid.

15. The object producing method according to claim 1, wherein a total amount of the resin and the organic solvent is 90.0% by mass or greater relative to a mass of the object forming liquid.

16. The object producing method according to claim 1, wherein the metal particles contain at least one selected from the group consisting of aluminum, zinc, and magnesium.

17. The object producing method according to claim 1, wherein surfaces of the metal particles are free of coating with a resin.

18. The object producing method according to claim 1, wherein a viscosity of the object forming liquid at 25 degrees C. is 5 mPa·s or higher but 50 mPa·s or lower.

* * * * *